Patented Dec. 3, 1946

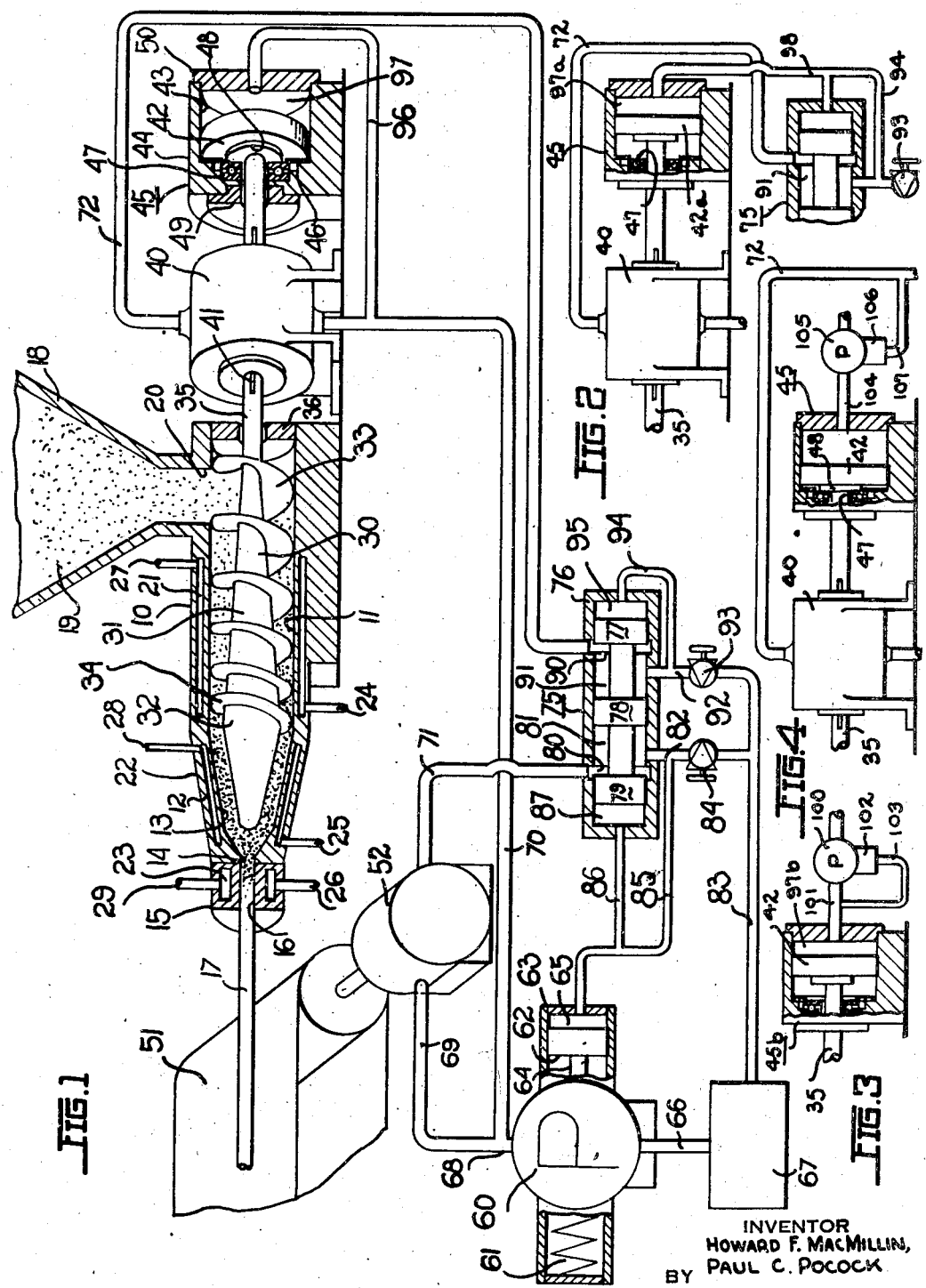

2,411,971

UNITED STATES PATENT OFFICE 2,411,971

EXTRUSION MACHINE

Howard F. MacMillin, Mount Gilead, and Paul C. Pocock, Marion, Ohio, assignors to The Hydraulic Development Corp., Inc., Wilmington, Del., a corporation of Delaware Application March 10, 1943, Serial No. 478,678

14 Claims. (Cl. 18—12)

This invention relates to continuous extrusion machines for extruding plastic materials.

An object of the invention is to provide an extrusion machine for plastic materials having a fluid supported thrust bearing for the extrusion screw of the machine.

Another object of the invention is to provide an extrusion apparatus for plastic material wherein the thrust load of the extrusion screw is absorbed hydraulically.

Another object of the invention is to provide an extrusion apparatus wherein the thrust load of the extrusion screw is absorbed hydraulically wherein the hydraulically actuated thrust load absorbing device has pressure applied thereto into proportion with the thrust load developed by the extrusion screw.

Another object of the invention is to provide an extrusion apparatus that includes hydraulic motors for driving the extrusion screw and a conveyer means for carrying the extruded material that are arranged in a hydraulic system for controlling the speed of operation of the hydraulic motors relatively constant regardless of the load imposed upon the motors.

It is another object of the invention to provide an extrusion apparatus in accordance with the foregoing object wherein hydraulic means is provided for absorbing the thrust of the extrusion screw that has hydraulic pressure applied thereon in a manner to prevent axial movement of the extrusion screw within the extrusior chamber unless the thrust load of the extrusion screw should exceed a predetermined maximum thrust.

It is another object of the invention to provide an extrusion apparatus for extruding plastic materials wherein the extrusion screw of the apparatus and a conveyer for removing the extruded material from the apparatus are driven by hydraulic motors that are independently controllable as to their independent speeds and which will remain in speed synchronism regardless of the load imposed upon the motors, all of which are accomplished by means of an automatic balancing hydraulic control system associated with the hydraulic motors.

Another object of the invention is to provide an extrusion apparatus in accordance with the foregoing object wherein the axial thrust of the extrusion screw is absorbed hydraulically and wherein the thrust absorbing hydraulic means has pressure applied thereto as determined by the thrust load produced by the extrusion screw so that the thrust load and the force counteracting the same will be maintained in a relatively balanced condition.

Another object of the invention is to provide an extrusion apparatus wherein the extrusion screw is provided with a hydraulic thrust bearing to absorb the axial thrust of the screw and a hydraulic motor is arranged axially with the thrust bearing and the extrusion screw for driving the screw.

It is another object of the invention to provide an extrusion apparatus wherein the extrusion screw is provided with a hydraulic thrust bearing that is adapted to have pressure applied thereon of a relatively constant value to absorb the axial thrust of the screw.

It is another object of the invention to provide an extrusion apparatus having a hydraulic thrust bearing for absorbing the axial thrust of the extrusion screw wherein the pressure applied to the thrust bearing is varied in proportion to the thrust load of the screw as reflected by the pressure to or from a hydraulic motor that is provided for driving the extrusion screw.

Another object of the invention is to provide an extrusion machine wherein the speed of rotation of the extrusion screw and the speed of the conveyer for carrying the extruded material from the extrusion machine are regulatable so that the conveyer moves the extruded material at a slightly greater rate than it is extruded from the machine by means of the extrusion screw whereby the extruded material is elongated slightly as it leaves the machine to increase its tensile strength.

Further objects and advantages will become apparent from the drawing and the following description.

In the drawing:

Figure 1 is a diagrammtic representation of an extrusion machine and a hydraulic system for operating the same.

Figure 2 is a diagrammatic view of a portion of the mechanism disclosed in Figure 1 showing the hydraulic thrust bearing receiving pressure from the back pressure control line that regulates the speed of a hydraulic motor for the machine.

Figure 3 is a diagrammatic representation of a portion of the hydraulic system showing the manner in which a relatively constant pressure can be supplied to the hydraulic thrust bearing by means of an independent fluid source.

Figure 4 is a diagrammatic representation of a portion of the system of the machine illustrating the manner in which the fluid pressure to the hydraulic thrust bearing from an independent source can be changed in response to changes in back pressure of the fluid motor for driving the extension screw.

The extrusion machine of this invention is particularly adapted for extruding plastic materials of a type that are fed into the machine in a granular or powdered form and are heated and plasticized within the machine during forward movement of the plastic material through the machine as produced by an extrusion screw so that the plasticized material can be forced through a nozzle or die to form the material into any desired shape upon passage through the die. Suitable conveying means is provided for carrying the extruded material away from the extrusion die as it is discharged therefrom. Any of the usual means for supporting the hot plastic material as it leaves the extrusion machine can be provided, such as air jets, for floating the extruded material until it has cooled sufficiently to permit it to be supported upon a conveying apparatus.

As the quantity of material extruded by a machine increases, and machines of larger capacity are made, the axial thrust load produced by the extrusion screw becomes extremely large so that considerable trouble is encountered with the use of conventional mechanical thrust bearings for absorbing the axial thrust of the extrusion screw. This invention, therefore, provides a hydraulic thrust bearing for the extrusion screw, thereby supporting the screw upon a column of fluid maintained under pressure which can either be constant or changing in accordance with varying conditions desired in the hydraulic system associated with the extrusion machine.

The apparatus of this invention is diagrammatically illustrated in Figure 1 wherein the machine is disclosed as consisting of an extrusion cylinder 10 having an internal bore 11 that is of constant diameter. The forward end 12 of the cylinder 10 is provided with a tapered bore 13 which converges toward a nozzle orifice 14 which connects with a die 15. The cross sectional opening of the orifice or channel 16 in the die 15 determines the cross sectional contour of the extruded piece 17 that emerges from the die 15.

The cylinder 10 is provided with a hopper 18 for receiving granular plastic material 19, or the material may be in powdered form, which discharges through a feed opening 20 provided in the cylinder 10 to conduct the plastic material into the cylinder bore 11 of the cylinder 10.

Heating chambers 21 are provided in the cylinder 10 around the portion thereof that contains the uniform diameter bore 11 for heating granular plastic material that is conducted through the bore 11 from the feed opening 20. If desired, the heating chamber 22 can be provided in the tapered front end portion 12 of the cylinder 10 and the die 15 can have a heating chamber 23. The heating chambers 21, 22 and 23 are provided with suitable inlet conduits 24, 25 and 26 and suitable fluid discharge conduits 27, 28 and 29, respectively.

An extrusion screw 30 is positioned within the extrusion cylinder 10. This screw consists of a core portion 31 that increases in diameter from the feed opening 20 of the extrusion machine toward the front end of the cylinder 10 and a core portion 32 in the tapered front end 12 of the cylinder 10 that decreases in diameter toward the front end of the machine so that the wall of the core portion 32 is uniformly spaced from the bore 13 in the front end section 12 of the extrusion cylinder 10. The flights 33 on the rear portion of the screw 30, adjacent the feed opening 20 are relatively coarse while the flights 34 within the forward end of the cylinder 10 have their pitch decreased so as to provide a more positive drive of the plastic material through the extrusion cylinder and compacting of the material while passing through the heating zone that is heated by the heating chamber 21.

The extrusion screw 30 is provided with a shaft 35 that extends through the rear wall 36 of the extrusion cylinder 10. This shaft 35 passes through a hydraulic motor 40 that is adapted to drive the shaft 35 and thus rotate the screw 30 for feeding plastic material through the extrusion cylinder. The driving mechanism of the hydraulic motor 40 is drivingly connected to the shaft 35 by means of a key adapted to ride in the keyway 41 provided in the shaft 35, whereby the shaft 35 can move axially through the motor 40 and thereby permit a limited amount of axial movement of the extrusion screw 30 in the extrusion cylinder 10. While the hydraulic motor 40 has been described as being constructed and arranged in a manner for axial mounting on the shaft 35, yet it is to be understood that any conventional hydraulic motor can be used to drive the shaft 35 either through a suitable gear reduction mechanism or belt system. The end of the shaft 35 carries a piston 42 that slidably engages the internal bore 43 of a cylinder 44 to provide a hydraulic thrust bearing for the screw 30.

The hydraulic thrust bearing, generally designated by the numeral 45, is arranged with the cylinder 44 thereof coaxially with the shaft 35. The front wall 46 of the cylinder 44 carries a bearing member 47, which can be of any antifriction bearing construction against which a shoulder 48 provided on the piston 42 is adapted to rest. A packing gland 49 is provided in the front wall 46 around the shaft 45 to prevent leakage of fluid around the shaft 45. The opposite end of the cylinder 44 is closed by means of a plate 50.

To carry the extruded member 17 away from the extrusion cylinder 10 there is provided a conveyer 51 that is driven by means of a hydraulic motor 52, the motor 52 being of any conventional construction that is suitably adapted for the purpose. Of course, it is to be understood that the machine shown in Figure 1 is diagrammatically represented and that suitable air jets will be provided around the extruded member 17 to initially suspend the same upon leaving the extrusion die 15.

The hydraulic system for the extrusion machine heretofore described includes a pump 60 for supplying fluid under pressure to the hydraulic motors 52 and 40. The pump 60 is of the variable delivery type of any conventional construction. As illustrated in this invention the pump 60 is adapted to be placed on-stroke by means of a spring 61 that is opposed by a piston 62 working within a cylinder 63, the piston 62 having a plunger 64 that engages the pump mechanism tending to place the pump off-stroke, the piston 62 moving in a left-hand direction as viewed in Figure 1. Therefore, the pump 60 is normally held on-stroke by means of the spring 61 and is only moved off-stroke when pressure is placed within the chamber 65 provided between the piston 62 and the cylinder 63.

The pump 60 is provided with a suction conduit 66 that connects to a supply reservoir 67. The pump 60 discharges through the conduit 68 that has one branch 69 for conducting fluid under pressure to the motor 52 and another branch 70 for conducting fluid under pressure to the motor 40. The discharge conduits 71 and 72 of the motors 52 and 40, respectively, conduct fluid from these motors to a balancing valve 75.

The balancing valve 75 consists of a cylinder 76 in which three interconnected piston heads 77, 78 and 79 are adapted to reciprocate. The conduit 71 from the motor 52 communicates with a recess 80 provided in the wall of the balancing valve 75 that is adapted to be covered and uncovered by means of the piston head 79. The recess 80, therefore, provides a variable restriction between the conduit 71 and the chamber 81 disposed between the piston heads 79 and 78 of the balancing valve 75. The chamber 81 communicates with a conduit 82 in which there is placed a restriction or choke valve 84, the conduit 82 connecting with a conduit 83 that communicates with the supply reservoir 67. The conduit 82 is also connected with a conduit 85 that extends into communication with the chamber 65 provided in the cylinder 63 on the pump 60, whereby the chamber 65 is responsive to the pressure existing in the chamber 81 in the balancing valve 75. A branch conduit 86 connects the conduit 85 with a chamber 87 provided adjacent the left-hand face of the piston head 79.

The discharge conduit 72 of the hydraulic motor 40 is connected to a recess 90 provided in the balancing valve 75 that is adapted to be covered and uncovered by the piston head 77 to thereby provide a variable restriction between the conduit 72 and the chamber 91 provided between the piston head 77 and the piston head 78 of the balancing valve 75. The chamber 91 communicates with the return conduit 83 through a conduit 92 having a variable restriction or choke valve 93 positioned therein. A conduit 94 connects the chamber 95 adjacent the right-hand face of the piston head 77 in the balancing valve 75 with the conduit 92 ahead of the choke valve 93 so that the space 95 will be communicating with the space 91 in the balancing valve 75.

The hydraulic thrust bearing 45 is connected to the pressure line 70 from the pump 60 by means of the conduit 96 so that the pressure in the chamber 97 of the hydraulic thrust bearing 45 will be the same pressure as that which exists in the pressure line 70 from the pump 60.

When the extrusion machine is operating and the hydraulic motor 40 is driving the extrusion screw 30 to move the plastic material through the extrusion cylinder 10 for forcing the material through the extrusion die 15 there is a large axial thrust developed by the extrusion screw 30 that tends to move the screw in a right-hand direction. This axial thrust load becomes extremely large when moving large quantities of material through the extrusion cylinder 10, and varies somewhat due to any variance in density of the granular material that is fed into the flights 33 of the extrusion screw 30 and by the plasticity of the plastic material when it is in the forward end 12 of the extrusion cylinder 10. The fluid pressure in the chamber 97 of the hydraulic thrust bearing 45 therefore absorbs this axial thrust of the extrusion screw 30, the column of liquid in the chamber 97 and the pressure applied thereto balancing the thrust load of screw 30 regardless of what this load may be. It will readily be seen that as long as pressure stands in the chamber 97 that movement of the screw 30 in a right-hand direction is resisted. If the pressure in the chamber 97 is just equal to the axial thrust load developed by the screw 30 then the piston 42 will float upon the liquid in the chamber 97. If the pressure in the chamber 97 is varied in accordance with the axial thrust load developed by the screw 30, then regardless of the thrust load developed by the screw 30 there will be no movement of the screw in a right-hand direction, the liquid in the chamber 97 maintaining the screw in its extreme leftward position, as shown in Figure 1. When the pressure is maintained constant in the chamber 97 then the hydraulic thrust bearing operates as an overload, or safety device, because if the thrust load produced by the screw 30 in a right-hand direction is greater than the hydraulic force urging the piston 42 in a left-hand direction, the screw 30 will move against the pressure in the chamber 97 to relieve the overload thrust developed by the screw.

As illustrated in Figure 1, the pressure in the chamber 97 is the same pressure that exists in the pressure line 70 from the pump, this pressure varying in accordance with the torque effort required by the motor 40 so that the pressure in the chamber 97 will vary and produce a force through the piston 42 that is proportional to the torque effort required by the motor 40 as reflected by the operation of the extrusion screw 30.

The speed of the motors 50 and 52 are independently controllable through means of the balancing valve and the chokes 84 and 93 so that they can operate the conveyer 51 and the extrusion screw 30 at any desired speed, in a manner to be hereinafter described, and will operate in synchronism once the speed relationship has been established. It is preferable that the hydraulic motor 52 shall operate the conveyer 51 at a speed slightly greater than the speed of discharge of the plastic piece 17 from the die 15 so that when the plastic piece 17 engages the conveyer there will be a slight stretch or drawing action in the plastic piece 17 tending to elongate the same and reduce its cross section slightly for orienting the molecular structure of the plastic material and thereby increasing the tensile strength of the material.

Operation

Assuming the extrusion machine to be in full operation; that is the motor 52 is driving the conveyer 51, the motor 40 is driving the extrusion screw 30, the plastic piece is being forced through the die 15 and the pump 60 is delivering liquid under pressure through the lines 69 and 70 to operate the hydraulic motors 52 and 40, with the branch line 96 conveying fluid pressure to the chamber 97 of the hydraulic thrust bearing 45. With these conditions in effect the piston 42 of the hydraulic thrust bearing 45 will be positioned with the shoulder 40 thereof in engagement with the bearing 47. With a maximum normal thrust produced by the extrusion screw 30 opposing the fluid pressure in the chamber 97, the bearing 47 need only to support a thrust load in the left-hand direction that is equal to the differential between the opposed thrusts developed by the screw 30 and the piston 42 to maintain the screw 30 in a predetermined position in the extrusion cylinder 10 and thereby maintain the cross sectional area between the core 32 and the bore 13 of the cylinder 10 relatively constant to obtain uniform discharge of plastic material through the extrusion die 15 by maintaining constant pressure thereon due to constant rotation of the screw 30 and the constancy of the cross sectional area between the core portion 32 and the bore 13.

The balancing valve 75 maintains constancy of speed of operation of the hydraulic motors 52 and 40, as well as maintaining them in synchronization after their speed of operation has been set.

Assuming that the torque load on the motor 52 is increased, there will be a decrease of pressure in the conduit 71 and thus in the chamber 81, the conduit 82, the conduit 85, the chamber 65 and the chamber 87. This reduction in pressure in chamber 87 of the balancing valve 75 permits the valve member within the valve 75 to move in a left-hand direction so that the head 79 reduces the restriction across the recess 80. Simultaneously, an increase of restriction is produced across the recess 90 since the piston head 77 is also moving in a left-hand direction. This increased restriction across the recess 90 would tend to slow down the motor 40 at this time. However, simultaneously with the previous action the pump 60 was permitted to go on stroke because the pressure in the chamber 65 is reduced thereby increasing the delivery from the pump 60 for supplying additional fluid under pressure to the motors 52 and 40. The additional pressure is utilized by the motor 52 in maintaining the speed of the motor constant to overcome the increased torque load that has been imposed thereon while the increased pressure passing through the pump 40 is dissipated across the increased resistance in the recess 90 to prevent this pump from increasing its speed of operation.

Assuming now the torque load is increased on the pump 40. Under this circumstance pressure in the conduit 72 falls which permits a drop in pressure in the chamber 91 of the balancing valve 75 on the right-hand side of the piston head 77, whereby the valve member in the balancing valve 75 moves in a right-hand direction to decrease the restriction through the recess 90. Simultaneously, the piston head 79 is moved in a right-hand direction to increase the resistance across the recess 80 thereby producing a drop in pressure in the chamber 81 and resulting in a drop in pressure in the chamber 65 of the control cylinder 63 for the pump 60. The pump 60 thereby moves toward its on-stroke position again delivering an increased quantity of fluid under pressure to the motors 52 and 40. Since the motor 40 is under an increased torque load the increased pressure will be dissipated through the motor and the speed will remain constant, while in the case of motor 52 the increased pressure will be dissipated through the increased resistance through the recess 80 so that its speed will not be changed by this increased pressure.

In order to change the speed of the motor 52 relative to the motor 40 the choke valve 84 is operated to reduce the restriction through the same. This results in a lowering of the pressure in the conduit 82 for shifting the balancing valve 75 in a manner heretofore referred to, to permit an increased flow of fluid through the motor 52, the total resistance through the motor control system for the motor 52 being less than it was previously so that there will be an increased fluid flow and thereby an increased speed of operation of the motor 52.

To increase the speed of operation of the motor 40 the choke valve 93 is operated to reduce the restriction across the same and thereby reduce the pressure in the conduit 92 and cause the balancing valve 75 to shift and increase the flow of fluid through the resistance formed by the recess 90, thereby reducing the total resistance in the control system for the motor 40 and increasing its speed of operation.

From the foregoing description it will be noticed that when the torque load on the motor 40 is increased that the pressure in the line 70 is increased to overcome the increased torque load. This increased pressure will be transmitted through the line 96 into the chamber 97 of the hydraulic thrust bearing 45 so that whenever the torque load is increased upon the motor 40 there will be an increased pressure in the chamber 97 urging the piston 42 of the thrust bearing 45 in a leftward direction to overcome the increased thrust produced by the extrusion screw 30 that has resulted from increased friction of movement of the plastic material through the extrusion cylinder 10. Therefore, the thrust load of the extrusion screw 30 will always be balanced by the hydraulic thrust bearing 45.

The system as heretofore described in Figure 1 maintains a balanced opposed thrust condition between the extrusion screw 30 and the thrust bearing 45 whereby the bearing 45 can oppose any thrust load developed by the extrusion screw 30 and prevent the screw 30 from moving relatively to the extrusion cylinder 10 so that there will always be a relatively constant pressure maintained upon the plastic material passing through the bore 13 of the extrusion cylinder 10 and therefore maintain constancy of flow of material through the extrusion die 15.

Under certain conditions it may be desirable that the thrust bearing 45 shall be used as an overload or safety feature to prevent overloading of the extrusion screw 30. To provide for this contingency the system as illustrated in Figure 2 can be used. In this system the hydraulic thrust bearing 45 has the chamber 97a thereof connected to the conduit 94 of the balancing valve 75 by means of a conduit 98. This conduit 98 therefore provides communication between the constant pressure conduit 94 and the chamber 97a, so that the relatively constant pressure in the chamber 91 of the balancing valve 75 is communicated to the chamber 97a. It will thus be seen that with a relatively constant pressure provided in the chamber 97a of the hydraulic thrust bearing 45 that when the axial thrust load of the extrusion screw 30 is greater than the hydraulic force developed by the piston 42a of the hydraulic thrust bearing 45 that the piston 42a will move in a rightward direction against pressure existing in the chamber 97a to relieve the thrust produced by the extrusion screw 30. As it is only a momentary overload there will be no further movement of the extrusion screw 30. Any condition of underload of the extrusion screw 30 will permit the screw to move in a leftward direction, as viewed in Figure 1, so that the screw 30 therefore floats upon the constant pressure maintained in the chamber 97a.

If the overload condition is a continuous overload, then the thrust of the screw 30 will force the piston 42a against the constant pressure in the chamber 97a until the screw strikes the rear of the extrusion chamber or the piston 42a of the hydraulic thrust bearing bottoms. On the other hand, if there is a continuous underload of the extrusion screw tending to relieve the thrust load, such as an increased fluidity of the plastic material, then the piston 42a of the hydraulic thrust bearing 45 will bottom upon the bearing 47 and prevent the extrusion screw 30 from advancing completely into the end of the extrusion chamber.

In Figure 3 there is shown another arrangement whereby constant pressure can be maintained in the chamber 97b of the hydraulic thrust bearing 45b. In this arrangement an independent variable delivery pump 100 is provided for delivering fluid under pressure through the conduit 101 into the chamber 97b of the hydraulic thrust bearing 45b. The variable delivery pump 100 is provided with a pressure control 102 that communicates with the discharge conduit 101 of the pump 100 through the conduit 103 whereby the discharge pressure of the pump 100 is maintained relatively constant. Such constant pressure controls for variable delivery pumps are well-known and therefore it is not believed that additional description of such controls is necessary. The operation of the hydraulic thrust bearing 45 is the same in this instance as that heretofore described with regard to the disclosure of the apparatus as shown in Figure 2, the pressure of the fluid being maintained constant in the chamber 97a of the device, as shown in Figure 2.

In Figure 4 there is shown a slightly modified arrangement wherein an independent pressure source is made responsive to the discharge pressure from the hydraulic motor 40 so that the independent pressure source will vary the pressure of the fluid in the hydraulic thrust bearing 45 in accordance with the torque load imposed upon the hydraulic motor 40 as reflected by the discharge pressure therefrom. In this arrangement the hydraulic thrust bearing 45 is the same as that heretofore described with regard to the device disclosed in Figure 1 and the shoulder 48 of the piston 62 is adapted to engage the bearing 47 to maintain the position of the extrusion screw 30 within the extrusion cylinder. An independent variable delivery fluid pump 105 has the discharge side thereof connected to the chamber 97 of the hydraulic thrust bearing 45 by means of a conduit 104. The variable delivery pump has a conventional control element 106 that is connected to the discharge conduit 72 of the hydraulic motor 40 by means of a conduit 107. Therefore, the pressure delivered into the conduit 104 by the pump 105 is responsive to the pressure existing in the discharge conduit 72 of the hydraulic motor 40 so that whenever this discharge pressure changes due to a change in the torque load of the hydraulic motor 40, the pressure in the chamber 97 will be changed to balance the change in thrust of the extrusion screw as reflected by the change in torque load on the hydraulic motor 40. In this arrangement, therefore, it is possible to provide pressure in the chamber 97 which is just sufficient to balance the axial thrust of the extrusion screw at any time during the operation of the extrusion machine from the time it begins to operate until a maximum thrust load is developed. It will be understood that during the initial starting of the equipment that the axial thrust load of the extrusion screw is relatively light because the extrusion chamber is not filled and material is not being extruded through the extrusion die. Therefore, if the pressure in the chamber 97 of the hydraulic thrust bearing 45 is made responsive to the pressure in the discharge line from the hydraulic motor 40 and thus is responsive to the torque load as reflected by the axial thrust developed by the extrusion screw that the pressure in the chamber 97 will be light and therefore just sufficient to balance the light axial thrust load developed by the extrusion screw during the initial operation of the machine when it is starting on a new cycle of operation.

While the apparatus disclosed and described herein constitutes a preferred form of the invention, yet it is to be understood that the apparatus is capable of considerable alteration without departing from the spirit of the invention, and that all such modifications as fall within the scope of the appended claims are intended to be included herein.

Having thus fully described our invention what we claim as new and desire to secure by Letters Patent is:

1. An extrusion machine consisting of an extrusion cylinder, an extrusion screw rotatable in said cylinder, a liquid chamber co-axial with said extrusion screw, a piston in said chamber in co-operative engagement with said extrusion screw, thrust bearing means associated with said extrusion screw for absorbing any forwardly directed thrust of the screw and positioning the same in its normally operating forward position in said extrusion cylinder, a fluid circuit for supplying liquid under pressure to said chamber for acting against said piston to maintain said extrusion screw in its forwardmost position and to absorb all rearwardly directed axial thrust of said extrusion screw, and means in said fluid circuit and responsive to increase and decrease of torque from said screw for correspondingly increasing and decreasing pressure within the circuit and said hydraulic bearing whereby to maintain said piston and screw in relatively fixed position despite torque changes effecting said screw.

2. An extrusion machine consisting of an extrusion cylinder, an extrusion screw rotatable in said cylinder, a liquid chamber co-axial with said extrusion screw, a piston in said chamber in cooperative engagement with said extrusion screw, thrust bearing means associated with said extrusion screw for absorbing any forwardly directed thrust of the screw and position the same in its normally operating forward position in said extrusion cylinder, a fluid circuit for supplying liquid under pressure to said chamber for acting against said piston to maintain said extrusion screw in its forwardmost position and to absorb all rearwardly directed axial thrust of said extrusion screw, and means within said circuit and interconnected with said driving means to increase and decrease the pressure within said hydraulic bearing in response to air increase and decrease in the torque from said screw for correspondingly increasing and decreasing pressure within the circuit and said hydraulic bearing whereby to maintain said piston and screw in relatively fixed position despite torque changes effecting said screw, said pressure being supplied to said chamber being maintained at a value that the force produced by said piston is just slightly greater than the axial thrust produced by said extrusion screw whereby said bearing means only carries a thrust load that is determined by the differential in force developed by said piston and said extrusion screw.

3. An extrusion machine consisting of an extrusion cylinder, an extrusion screw, a first hydraulic motor for driving said extrusion screw, a source of variable pressure fluid supply for said motor, control means actuated by the pressure in the discharge line from said motor to regulate the fluid supplied to said motor to control the speed of rotation thereof and thus control the speed of rotation of said screw, conveying means for carrying extruded material away from said extrusion cylinder, a second hydraulic motor means for driving said conveying means, a variable pressure source of fluid supply for said conveying motor means, and control means actuated by the pressure in the discharge line from said second motor for regulating the fluid supplied through said second motor means for thereby controlling its speed of operation, said control means being operably interconnected to operate simultaneously upon a drop in pressure in the discharge line from either motor and change the delivery rate of the fluid supplying means without affecting the speed operation of either of said motors.

4. An extrusion machine consisting of an extrusion cylinder, an extrusion screw, a first hydraulic motor for driving said extrusion screw, a source of variable pressure fluid supply for said motor, control means actuated by the pressure in the discharge line from said motor to regulate the fluid supplied to said motor to control the speed of rotation thereof and thus control the speed of rotation of said screw, conveying means for carrying extruded material away from said extrusion cylinder, a second hydraulic motor means for driving said conveying means, a variable pressure source of fluid supply for said conveying motor means, and control means actuated by the pressure in the discharge line from said second motor for regulating the fluid supplied through said conveying motor means for thereby controlling its speed of operation, said control means being operably interconnected to operate simultaneously upon a drop in pressure in the discharge line from either motor and change the delivery rate of the fluid supplying means without affecting the speed operator of either of said motors, said conveying means being operated by the motor means for the same at a speed greater than the rate of extrusion of the plastic material from the extrusion cylinder whereby the extruded material will be elongated by the conveying means after leaving the extrusion machine.

5. An extrusion machine consisting of an extrusion cylinder, an extrusion screw therein, fluid motor means for rotating said screw, a conveyer means for carrying extruded material from the extrusion machine, fluid motor means for driving said conveyer means, a source of variable pressure fluid supply for both of said motor means, and means responsive to the discharge pressure from either of said motor means for effecting a change in operation of the source of fluid supply to change the volume of fluid supplied therefrom as determined by changes in load requirements on either of said motor means to maintain the speed of operation thereof substantially constant.

6. An extrusion machine consisting of an extrusion cylinder, an extrusion screw, a fluid motor for driving said extrusion screw, a fluid actuated thrust bearing for said extrusion screw having a pressure chamber therein whereby the axial thrust of said extrusion screw is absorbed by the fluid in said chamber, control means for regulating the discharge of fluid from said hydraulic motor having means to change the resistance to fluid flow from said motor in response to the load imposed upon said motor for maintaining the speed thereof substantially constant with a varying pressure on the inlet and discharge side of said motor, and means for conducting fluid from the discharge side of said motor to said pressure chamber in said fluid thrust bearing for regulating the pressure in said chamber in response to the discharge pressure from said motor and thus in response to the load imposed upon said motor.

7. An extrusion machine consisting of an extrusion cylinder, an extrusion screw, a fluid motor for driving said extrusion screw, a completely hydraulic thrust bearing for said extrusion screw having a pressure chamber therein for solely absorbing the axial thrust of said extrusion screw by the fluid in said chamber, control means for regulating the discharge of fluid from said hydraulic motor having means to change the resistance to fluid flow from said motor in response to the load imposed upon said motor for maintaining the speed thereof substantially constant with a varying pressure on the inlet and discharge side of said motor, and means for conducting fluid from the inlet side of said motor to said pressure chamber in said hydraulic thrust bearing for regulating the pressure in said chamber in response to the inlet pressure to said motor and thus in response to the load imposed upon said motor.

8. An extrusion machine consisting of, an extrusion cylinder, an extrusion screw rotatable within said cylinder for feeding plastic material therethrough, a hydraulic motor operably connected to said extrusion screw for driving same, a variable delivery fluid source for supplying fluid under pressure to said motor, a hydraulic thrust bearing for said extrusion screw consisting of a single acting hydraulic motor for opposing the axial thrust of said extrusion screw, means hydraulically connecting said single acting motor to said variable delivery fluid source, and means responding to fluid pressure variations in said first motor to change the volume and pressure of the fluid delivered by said variable delivery source in accordance with the torque effort applied on said first motor by said screw to maintain the speed of rotation of said first motor relatively constant and to apply said varying fluid pressure on said single acting motor concurrently with the application of the fluid pressure upon said first motor.

9. An extrusion machine consisting of, an extrusion cylinder, an extrusion screw rotatable within said cylinder for feeding plastic material therethrough, a hydraulic motor operably connected to said extrusion screw for driving same, a variable delivery fluid source for supplying fluid under pressure to said motor, a hydraulic thrust bearing for said extrusion screw consisting of a single acting hydraulic motor for opposing the axial thrust of said extrusion screw, means hydraulically connecting said single acting motor to said variable delivery fluid source, and means responsive to the torque effort of said first motor for changing the pressure of fluid applied upon said motor and upon said single acting motor concurrently.

10. An extrusion machine consisting of, an extrusion cylinder, an extrusion screw rotatable within said cylinder, a hydraulic motor operably connected to said screw for driving the same, a variable delivery hydraulic fluid source, a hydraulic thrust bearing for said extrusion screw consisting of a single acting motor, means hydraulically connecting said fluid source with the inlet of said first motor and with said single acting motor, means hydraulically connecting the discharge side of said first motor with said source and including resistance valve means therein to prevent a free return of hydraulic fluid from said first motor to said source and establish a fluid pressure in the hydraulic connecting means between said first motor and said resistance valve means, and means responsive to the hydraulic fluid pressure between said first motor and said resistance valve means for changing the fluid pressure delivered by said source to said first motor to maintain the speed thereof relatively constant and change the pressure upon said single acting motor in accordance with the changing fluid pressure.

11. A machine for the extrusion of plastic material having an extrusion screw for feeding relatively constant quantities of plastic material through an extrusion die when the extrusion screw is rotated, means for maintaining said screw in a relatively fixed position comprising a hydraulic thrust bearing including a chamber and a piston in said chamber attached to said screw, a fluid circuit connected to said thrust bearing, means for driving said screw, and means within said circuit and interconnected with said driving means to increase and decrease the pressure within said hydraulic bearing in response to an increase and decrease in the torque from said screw whereby to maintain said piston and screw in relatively fixed position despite torque changes effecting said screw.

12. A machine for the extrusion of plastic material having an extrusion screw for feeding relatively constant quantities of plastic material through an extrusion die when the extrusion screw is rotated, means for maintaining said screw in a relatively fixed position comprising a hydraulic thrust bearing including a chamber and a piston in said chamber attached to said screw, a fluid means connected to said thrust bearing, means for driving said screw, and means within said circuit and interconnected with said driving means to increase and decrease the pressure within said hydraulic bearing in response to an increase and decrease in the torque from said screw whereby to maintain said piston and screw in relatively fixed position despite torque changes effecting said screw.

13. A machine for the extrusion of plastic material having an extrusion screw for feeding relatively constant quantities of plastic material through an extrusion die when the extrusion screw is rotated, means for maintaining said screw in a relatively fixed position comprising a hydraulic thrust bearing including a chamber and a piston in said chamber attached to said screw, a fluid circuit connected to said thrust bearing, means for driving said screw, and means in said fluid circuit and whereby to maintain said piston and screw in relatively fixed position despite torque changes effecting said screw.

14. A machine for the extrusion of plastic material having an extrusion screw for feeding relatively constant quantities of plastic material through an extrusion die when the extrusion screw is rotated, means for maintaining said screw in a relatively fixed position comprising a hydraulic thrust bearing including a chamber attached to said screw, a fluid circuit connected to said thrust bearing, means in said fluid circuit for driving said screw, and means within said circuit interconnected with said driving means to increase and decrease the pressure within said hydraulic bearing in response to an increase and decrease in the torque from said screw whereby to maintain said piston and screw in relatively fixed position despite torque changes effecting said screw.

HOWARD F. MacMILLIN.
PAUL C. POCOCK.